(12) United States Patent
Campacci

(10) Patent No.: US 10,961,699 B2
(45) Date of Patent: Mar. 30, 2021

(54) MINERAL WOOL INSULATION BOARD SYSTEM WITH MECHANICAL FASTENERS AND REINFORCING MESH

(71) Applicant: DUROCK ALFACING INTERNATIONAL LIMITED, Woodbridge (CA)

(72) Inventor: Gary Campacci, Woodbridge (CA)

(73) Assignee: DUROCK ALFACING INTERNATIONAL LIMITED, Woodbridge (CA)

( * ) Notice: Subject to any disclaimer, the term of this patent is extended or adjusted under 35 U.S.C. 154(b) by 0 days.

(21) Appl. No.: 16/548,946

(22) Filed: Aug. 23, 2019

(65) Prior Publication Data

US 2020/0123765 A1    Apr. 23, 2020

(30) Foreign Application Priority Data

Oct. 19, 2018    (CA) .............................. CA 3021461

(51) Int. Cl.
*E04B 1/70* (2006.01)
*E04B 1/64* (2006.01)
(Continued)

(52) U.S. Cl.
CPC .................. *E04B 1/70* (2013.01); *B32B 5/02* (2013.01); *B32B 7/12* (2013.01); *E04B 1/642* (2013.01);
(Continued)

(58) Field of Classification Search
CPC . E04B 1/70; E04B 1/642; E04B 1/665; E04B 2/707; E04B 2/28;
(Continued)

(56) References Cited

U.S. PATENT DOCUMENTS 5,410,852 A * 5/1995 Edgar ..................... E04B 1/765
52/408
5,979,131 A * 11/1999 Remmele ................ E04B 1/762
156/306.6

(Continued)

OTHER PUBLICATIONS https://cdn01.rockwool.com/siteassets/o2-rockwool/documentation/brochures/commercial/cavityrock-comfortbatt-for-exterior-walls-brochure.pdf?f=20180618125744, Jun. 2018 (Year: 2018).*

(Continued)

*Primary Examiner* — Babajide A Demuren
(74) *Attorney, Agent, or Firm* — Norton Rose Fulbright Canada LLP (57) ABSTRACT

A method of constructing an exterior insulated wall is provided. The method includes: erecting a wall structure of vertical studs and sheathing mounted to the studs; applying a moisture barrier layer and an adhesive layer; mounting a rear surface of a mineral wool insulation board to the adhesive layer, the rear surface having vertically extending drainage grooves, a front surface of the insulation board having a reinforcing mesh adhered thereto; securing the mineral wool insulation board to the studs with corrosion resistant screws and washers; and applying a weather resistant coating on the reinforcing mesh and washers. The mineral wool insulation board includes mechanically entangled non-woven hydrophobic fibers spaced apart by air voids to define a compressible fibrous mass. The washers and screws exert pressure on a compressed zone of the compressible fibrous mass which reduces moisture permeability, increases volume percentage of fibers, and lowers volume percentage of air voids.

14 Claims, 10 Drawing Sheets

(51) Int. Cl.
 *E04C 2/16* (2006.01)
 *B32B 5/02* (2006.01)
 *B32B 7/12* (2006.01)

(52) U.S. Cl.
 CPC .......... *E04C 2/16* (2013.01); *B32B 2262/108* (2013.01); *B32B 2307/7265* (2013.01); *B32B 2419/00* (2013.01)

(58) Field of Classification Search
 CPC ..... E04B 2002/7472; E04B 2002/0286; E02D 19/00; E04F 2203/04
 See application file for complete search history.

(56) References Cited

U.S. PATENT DOCUMENTS

| | | | | |
|---|---|---|---|---|
| 6,131,353 | A * | 10/2000 | Egan | B32B 5/02 52/408 |
| 6,233,890 | B1 * | 5/2001 | Tonyan | E04B 1/70 52/302.1 |
| 6,298,620 | B1 * | 10/2001 | Hatzinikolas | E04B 1/70 52/302.1 |
| 6,410,118 | B1 * | 6/2002 | Reicherts | B32B 13/04 428/141 |
| D493,897 | S * | 8/2004 | Campacci | D25/158 |
| 6,807,786 | B1 * | 10/2004 | Peck | E04F 13/02 52/514.5 |
| D588,280 | S * | 3/2009 | Gleeson | D25/119 |
| 8,640,421 | B2 * | 2/2014 | Frobosilo | E04B 1/66 52/169.14 |
| 9,540,806 | B2 * | 1/2017 | Lasselsberger | E04B 1/7645 |
| 9,856,645 | B2 * | 1/2018 | Dahlin | E04B 2/04 |
| 10,689,851 | B2 | 6/2020 | Rapone et al. | |
| 2011/0154764 | A1 * | 6/2011 | Wang | C04B 28/02 52/309.1 |
| 2012/0324814 | A1 * | 12/2012 | Amend | E04B 1/7645 52/302.1 |
| 2013/0042557 | A1 * | 2/2013 | Egan | D03D 19/00 52/343 |
| 2015/0275509 | A1 * | 10/2015 | Ciuperca | E04B 1/625 52/745.09 |
| 2017/0073964 | A1 * | 3/2017 | Collins | E04F 13/047 |

OTHER PUBLICATIONS

Rockwool_Stone_wool_factsheet_moisture.pdf https://www.rockwoolgroup.com/siteassets/fact-sheets/gated-versions/factsheet_moisture.pdf, Jan. 2020 (Year: 2020).*

ROXUL_Rebrands_to_ROCKWOOL.pdf https://www.rockwool.com/about/media/roxul-rebrands-to-rockwool/, Jan. 2018 (Year: 2018).*

* cited by examiner

MINERAL WOOL INSULATION BOARD SYSTEM WITH MECHANICAL FASTENERS AND REINFORCING MESH

TECHNICAL FIELD

The invention relates to a system of construction that includes a mineral wool insulation board with mechanical fasteners and reinforcing mesh beneath a weatherproof exterior covering.

BACKGROUND OF THE ART

The construction of an externally installed insulated finished wall surface serves to supplement or replace internally installed building insulation such as spray foam or flexible fibrous insulation batts.

Moisture penetration has caused problems with corrosion and other water damage to the underlying building components of the exterior wall covered with an exterior insulated system. Wind and rain tend to create pressure imbalance conditions that drives moisture through joints and cracks in the cladding that result from construction or inevitably form during the lifecycle of the cladding. Moisture barriers are provided between the underlying building substrate and the cladding to prevent penetration of moisture into building elements that could be damaged by metal corrosion, wood rot, contamination or mold for example. Drainage grooves on the inside surface of exterior panels drain the trapped moisture and direct water to bleed holes in the base of the cladding.

When mechanical fasteners are used to mount insulating panels, the fasteners penetrate through the moisture barrier. Moisture that collects within the insulating panels can migrate through the penetrations in the moisture barrier created by the mechanical fasteners.

Mineral wool insulation boards are manufactured of fibers that are extruded in a quasi-random manner in layers deposited and built up to form a fibrous mass defined by mechanically entangled fibers with air voids therebetween. The air voids result in an insulating capability but also provide a pathway for moisture penetration. The density of mineral wool insulation boards is dependent on the relative volume of mineral wool fibers and air voids. Increased density may be desirable to provide structural stiffness, binders may be added to bind contact points of fibers together, or fibers may locally melt or weld together during manufacture to provide stiffness.

Features that distinguish the present invention from the background art will be apparent from review of the disclosure, drawings and description of the invention presented below.

DISCLOSURE OF THE INVENTION

The invention provides a method of constructing an exterior insulated wall, the method comprising: erecting a wall structure of vertical studs and sheathing mounted to the studs defining a vertical substrate surface; applying a moisture barrier layer and an adhesive layer; mounting a rear surface of a mineral wool insulation board to the adhesive layer, the rear surface having vertically extending drainage grooves defining a plurality of bosses whereby the bosses engage the adhesive layer and the drainage grooves define moisture flow channels between the mineral wool insulation board and the adhesive layer, a front surface of the mineral wool insulation board having a reinforcing mesh adhered thereto; securing the mineral wool insulation board to the studs with corrosion resistant screws and washers, the screws extending through the reinforcing mesh and the bosses of the mineral wool insulation board, through the adhesive and moisture barriers, and through the sheathing into the studs; and applying a weather resistant coating on the reinforcing mesh and washers; wherein the mineral wool insulation board comprises mechanically entangled non-woven hydrophobic fibers spaced apart by air voids to define a compressible fibrous mass; and wherein the washers and screws exert pressure on a compressed zone of the compressible fibrous mass adjacent to the screws and beneath the washers, the compressed zone having a reduced moisture permeability with a higher volume percentage of fibers and a lower volume percentage of air voids relative to a non-compressed remainder of the compressible fibrous mass.

DESCRIPTION OF THE DRAWINGS

In order that the invention may be readily understood, one embodiment of the invention is illustrated by way of example in the accompanying drawings.

FIGS. 4-6, 9-12 show the progressive construction of an exterior insulated wall and FIGS. 7-8 show mechanical fasteners used in the construction.

Further details of the invention and its advantages will be apparent from the detailed description included below.

DETAILED DESCRIPTION OF PREFERRED EMBODIMENTS

Figure 1:
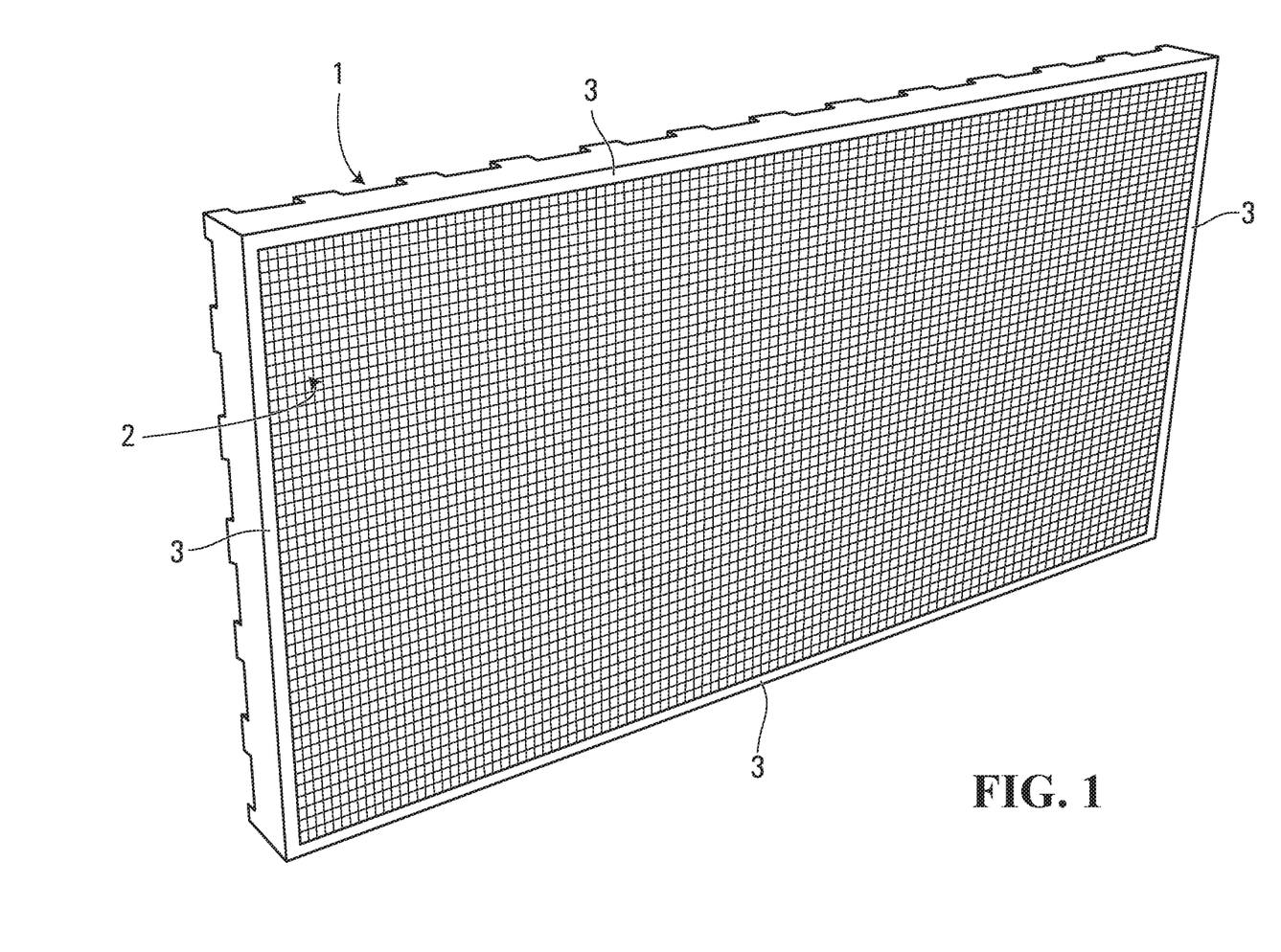
FIG. 1 is a front perspective view of an example mineral wool insulation board (4 ft. long×2 ft. high) having a reinforcing fiber mesh adhered to the front surface (apart from the peripheral edge area that is free of mesh) and drainage grooves in the rear surface.
Figure 2:
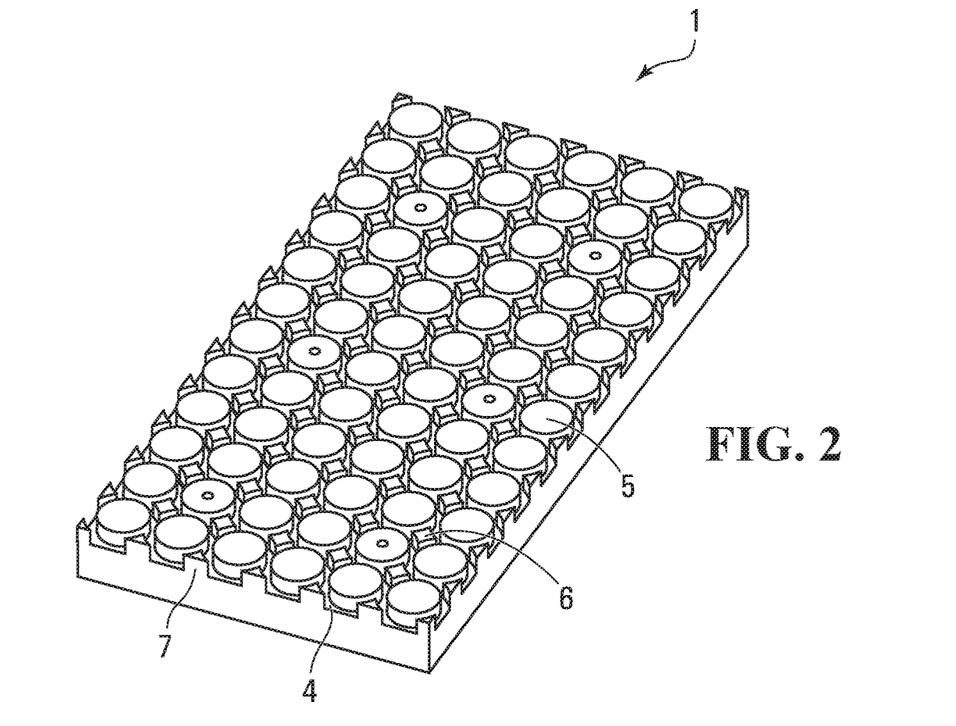
FIG. 2 is a rear perspective view of the mineral wool insulation board of FIG. 1.
Figure 3:
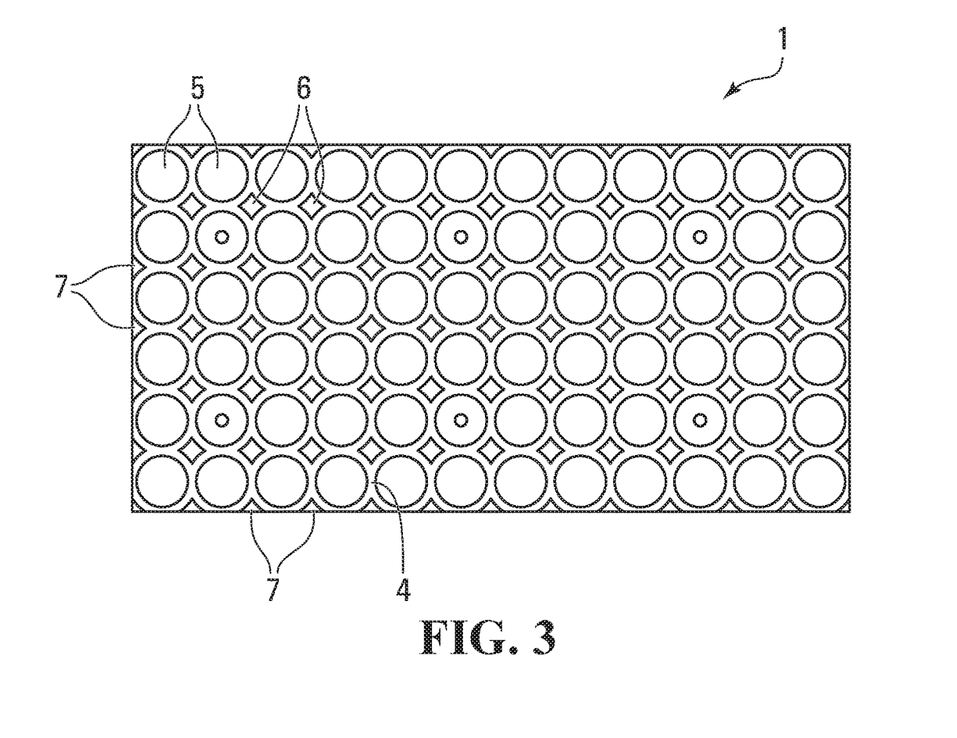
FIG. 3 is a rear elevation view of the mineral wool insulation board of FIGS. 1-2.

FIGS. 1 to 3 show an example mineral wool insulation board 1 being 4 ft. long×2 ft. high. The mineral wool insulation board 1 is fabricated of mechanically entangled non-woven hydrophobic fibers spaced apart by air voids and defining a flexible compressive fibrous mass. A reinforcing fiber mesh 2 is adhered to the front surface apart from the peripheral edge area 3 that is free of mesh. The multiple mineral wool insulation boards 1 are installed on a wall surface side-by side with abutting joints. In the example shown, the reinforcing mesh 2 comprises a grid of overlapping strands of twisted fibers and can be adhered or bonded to the front surface of the mineral wool insulation board 1 with an adhesive.

As seen in FIGS. 2-3 the rear surface of the mineral wool insulation board 1 is provided with moisture drainage grooves 4. In the example shown the drainage grooves 4 are interconnecting annular recesses cut using a rotating annular cutter (not shown) which removes mineral wool from the rear surface. The cutting of the annular grooves 4 results in spaced apart disc shaped bosses 5 and on the outer edges diamond shaped lands 6 and triangular shaped lands 7 where the board thickness has not been reduced. The drainage grooves 4 define moisture trapping gravity flow channels between the mineral wool insulation board 1 and the adjacent underlying adhesive layer (FIG. 6), described in detail below.

Figure 4:
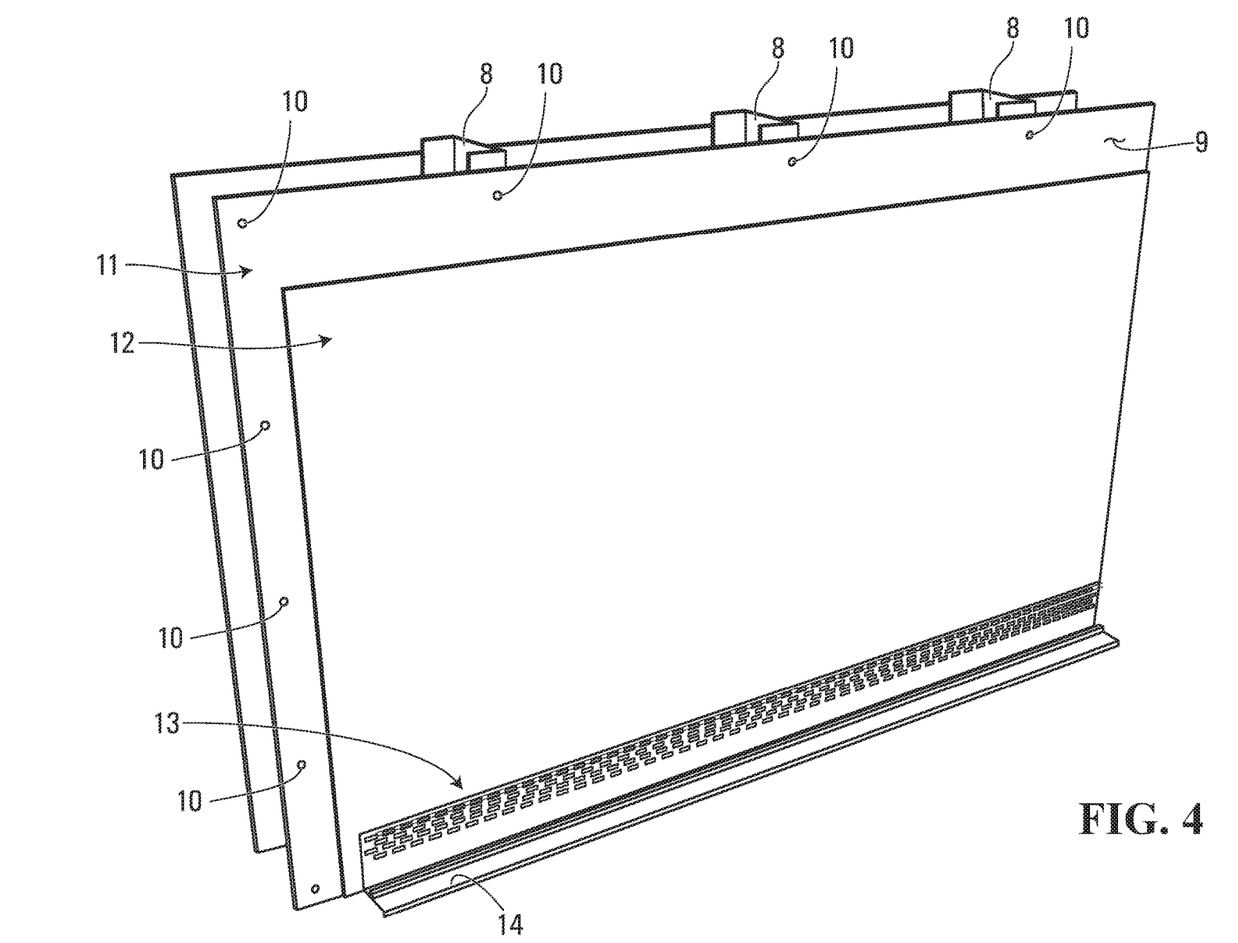
FIG. 4 is a perspective view of a wall structure constructed with vertical studs and sheathing coated with a moisture barrier and including a starter flashing at the base of the wall.

The method of constructing an exterior insulated wall, using such mineral wool insulation boards 1 commences with erecting a conventional wall structure as seen in FIG. 4 having a plurality of vertical studs 8 in a horizontally spaced apart array with sheathing 9 mounted to the studs 8 with screws 10. The exterior surface of the sheathing 9 defines a vertical substrate surface 11 on which the insulation and exterior weatherproof covering can be affixed.

The studs 8 are typically wood or roll formed sheet steel with a minimal galvanized or corrosion resistant coating not capable of protecting the steel from long term exposure to water. The sheathing 9 is typically plywood, gypsum board, oriented strand board or the like which is also not capable of resisting long term exposure to water or weather.

Mechanical fasteners such as screws 10 create perforations by piercing through the sheathing 9 and studs 8. Air and therefore air borne moisture can penetrate through these perforations and as a result moisture can accumulate inside the structure causing metal corrosion, rot, mold and water damage to the sheathing 9 and interior elements of the building. Accordingly maintenance of a continuous moisture barrier on the exterior of the sheathing 9 is important to the long term service life of the building.

FIG. 4 shows the next step of applying a moisture barrier layer 12 over the substrate surface 11 of the sheathing 9. The moisture barrier 12 is continuous and covers the joints in the sheathing, and seals over the embedded heads of the sheathing screws 10 and the perforations in the sheathing caused by the installation of the sheathing screws 10.

Figure 5:
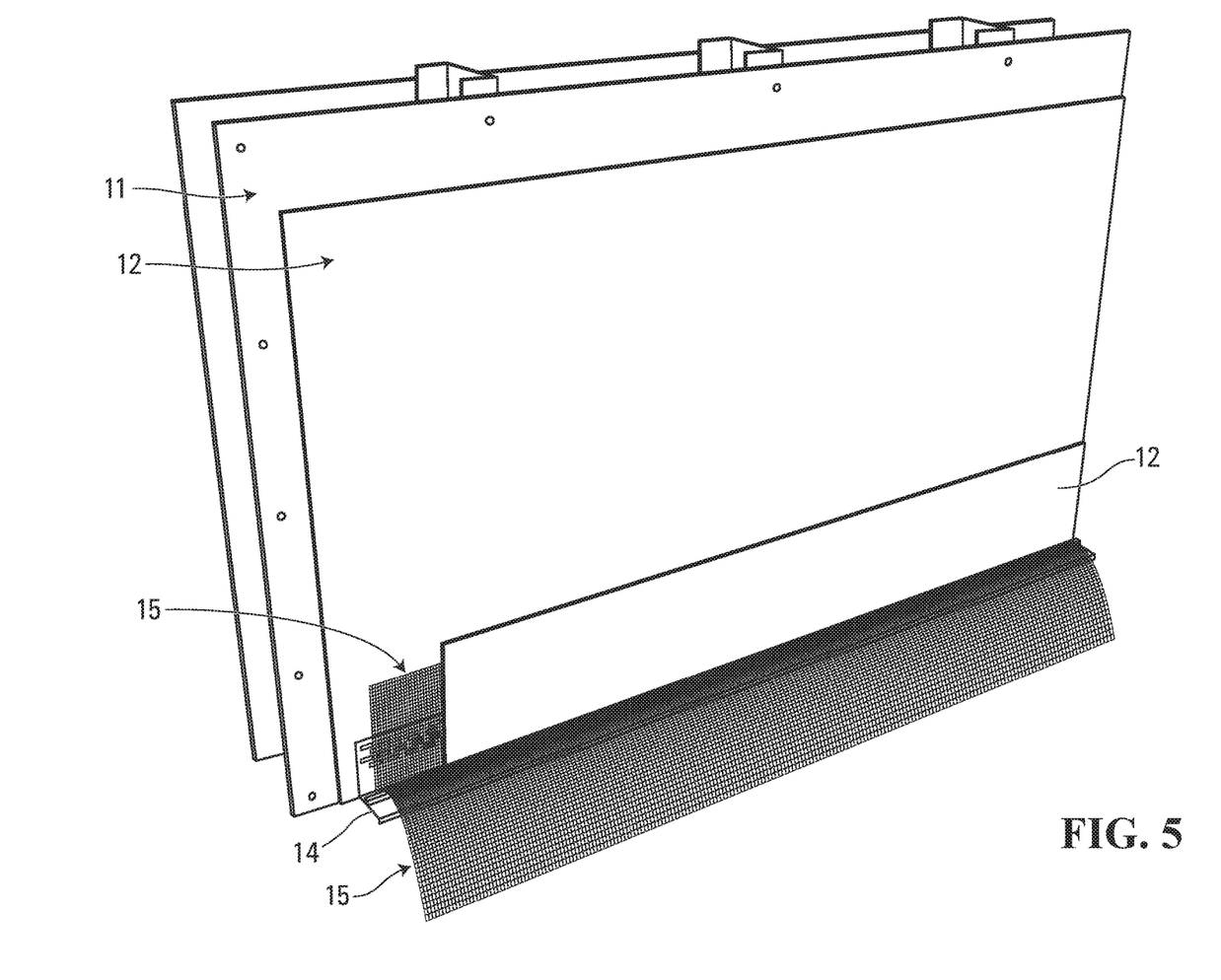
FIG. 5 is a perspective view showing the installation of a bottom edge wrap fiber mesh and moisture barrier applied over the starter flashing and bottom edge wrap fiber mesh.

The starter flashing 13 (PVC or metal) at the base of the wall in FIG. 4 intercepts any moisture running down the moisture barrier 12 under gravity, and redirects the moisture outwards away towards a drip edge 14. FIG. 5 shows a installation of a bottom edge wrap fiber mesh 15 over the flashing 14. The moisture barrier 12 layer is then also applied over the vertical leg of the starter flashing 14 and overlapping portion of the bottom edge wrap fiber mesh 15.

Figure 6:
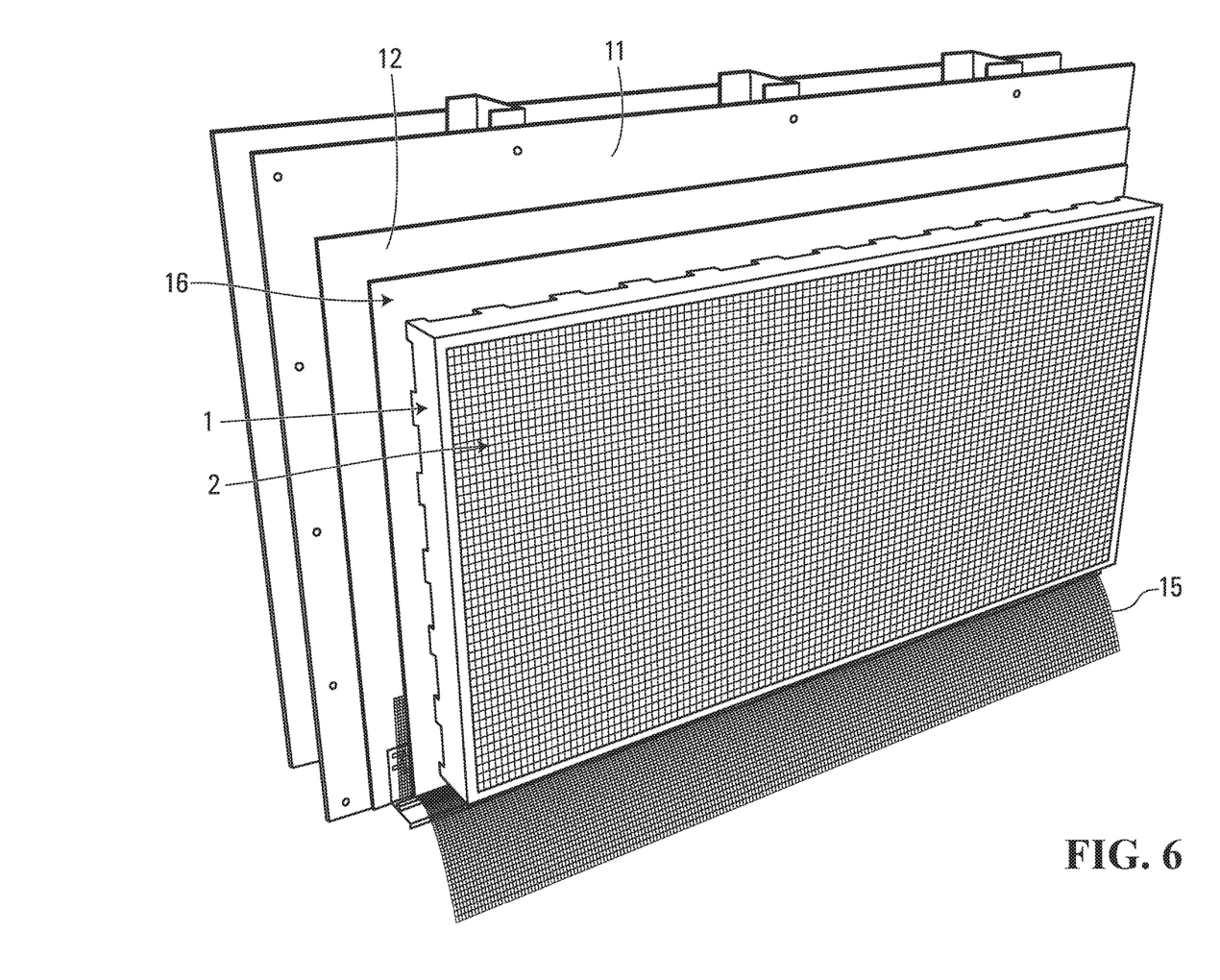
FIG. 6 is a perspective view showing the application of an adhesive layer over the moisture barrier layer, and mounting of the rear surface of the mineral wool insulation board onto the adhesive layer.

FIG. 6 shows the next step of applying an adhesive layer 16 over the moisture barrier layer 12 and then mounting the rear surface (see FIGS. 2-3) of the mineral wool insulation board 1 to the adhesive layer 16. Since the mineral wool insulation board 1 is a fibrous mass with relatively weak bonds between fibers, the adhesive layer 16 is insufficient to permanently hold the boards 1 and any finish coatings. However the adhesive layer is sufficient for temporary purposes to hold the boards 1 during fitting and mechanical fasteners (screws 17 and washers 18) are applied later in the construction as described below.

As seen in FIGS. 2-3, the rear surface of the boards 1 have vertically extending drainage grooves 4 that define a plurality of disc shaped bosses 5 that engage the adhesive layer 16. The drainage grooves 4 therefore define vertically extending moisture flow channels between the mineral wool insulation board 1 and the adhesive layer 16. The front surface of the mineral wool insulation board 1 includes the reinforcing mesh 2 adhered with adhesive applied during manufacture for example. The fibers of which the boards are made have a hydrophobic water repelling nature either due to a coating or due to an inherent characteristic of the fibers.

Figure 8:
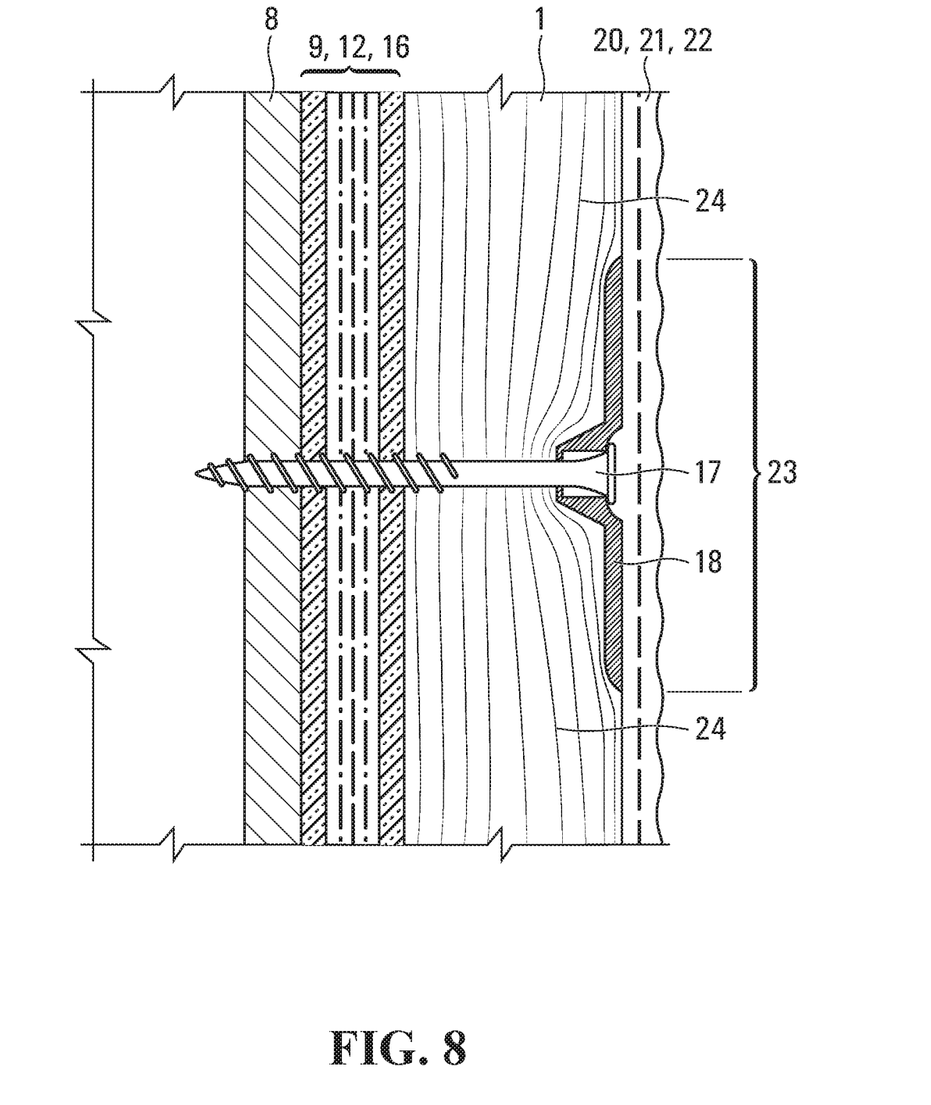
FIG. 8 is a vertical sectional view through a mechanical screw fastener and washer (like FIG. 7) along sectional line 8-8 of FIG. 9 showing the screw head countersunk within the washer and the outer washer surface being flush with front surface of the mineral wool insulation board.
Figure 9:
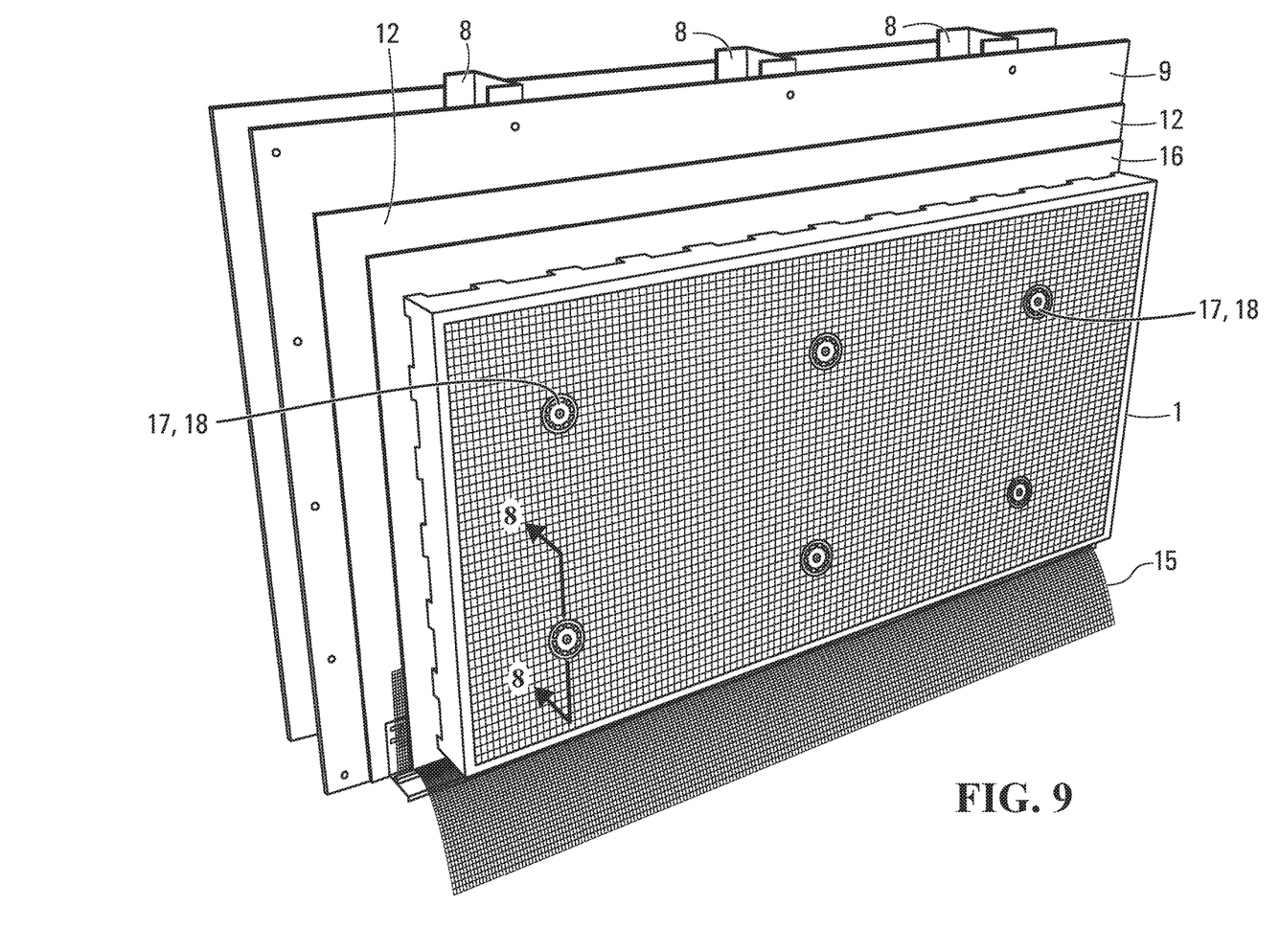
FIG. 9 is a front perspective view showing the installation of spaced apart screw fasteners and washers to secure the mineral wool insulation board to the studs where the washers engage the reinforcing fiber mesh and the screws penetrate through the mineral wool insulation board. adhesive layer and moisture barrier, through the sheathing and into the sheet metal studs.

As shown in FIG. 9 the mineral wool insulation boards 1 are to the studs 8 with corrosion resistant screws 17 and washers 18, the details of which are described below in connection with FIGS. 7-8. The flat washers 18 engage the reinforcing mesh 2 on the front face of the boards 1. The compression of the board 1 beneath the washer 18 is sufficient to make the outer washer surface rest flush with the front face of the board 1. Over compression would deform the fibrous mass and possibly block the gravity drainage channels formed by the annular drainage grooves 4. The screws 18 extend through the reinforcing mesh 2 and are aligned with the bosses 5 of the mineral wool insulation board 1. The front surface of the 2 foot by four foot mineral wool insulation board 1 can be marked visually with painted lines or dots spaced at 4 inch centers to show installers where to align the boards 1 and screws 17 with the studs 8 that are usually spaced at 16 inch or 24 inch centers. Preferably since the boards 1 are a fibrous flexible mass, the front surface of the board 1 can simply be partially perforated with a plurality of alignment holes that are each aligned with a center of the boss 5 beneath.

The screws 17 therefore extend through the full thickness of the board 1 at the boss 5 location and do not impede moisture flow through the vertically extending moisture flow channels between the mineral wool insulation board 1 and the adhesive layer 16. The screws 17 also perforate and extend through the adhesive layer 16, through the moisture barrier 12, and through the sheathing 9 before being embedded into the studs 8. Accordingly the screws 17, washers 18 and reinforcing mesh 2 provide a mechanical support structure directly from the studs 8 for supporting any exterior applied finish coating. The head of the screws 17 are embedded within the washers 18 (see FIGS. 7-8) and the outside flat surface of the washers 18 is flush with or partly embedded into the front surface of the board 1 covered in reinforcing mesh 2. The washers 18 and reinforcing mesh 2 are embedded in or are bonded to any weather resistant coating applied over the front surface of the boards 1. Accordingly, the screws 17 have: a point embedded in the studs 8 and sheathing 9; a screw shank extending through the relatively weak insulation board 1; and a head secured in the washer 18 that holds the reinforcing mesh 2, wherein the mesh 2 and washer 18 are embedded in weather resistant coating applied to the exterior.

Figure 10:
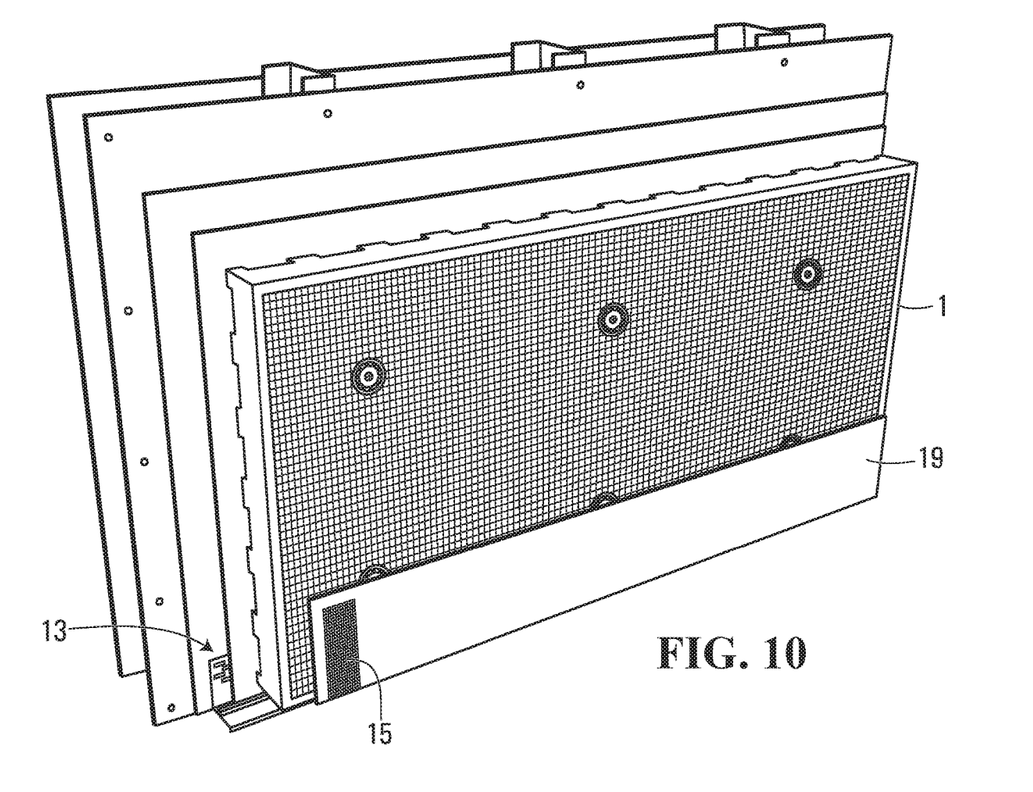
FIG. 10 is a front perspective view showing the bottom edge wrap fiber mesh installed to wrap the bottom edge of the mineral wool insulation board and overlaid with a preparation (prep) coat layer.
Figure 11:
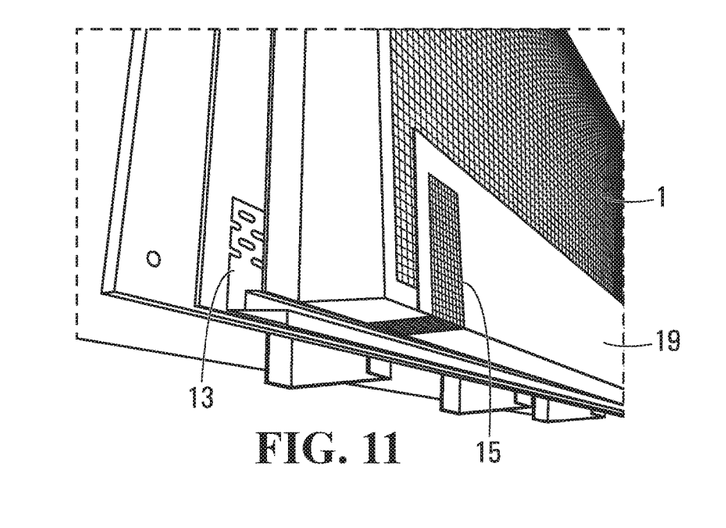
FIG. 11 is a bottom edge detail view showing the bottom edge wrap fiber mesh of FIG. 10 installed to wrap the bottom edge of the mineral wool insulation board and overlaid with the prep coat layer.
Figure 12:
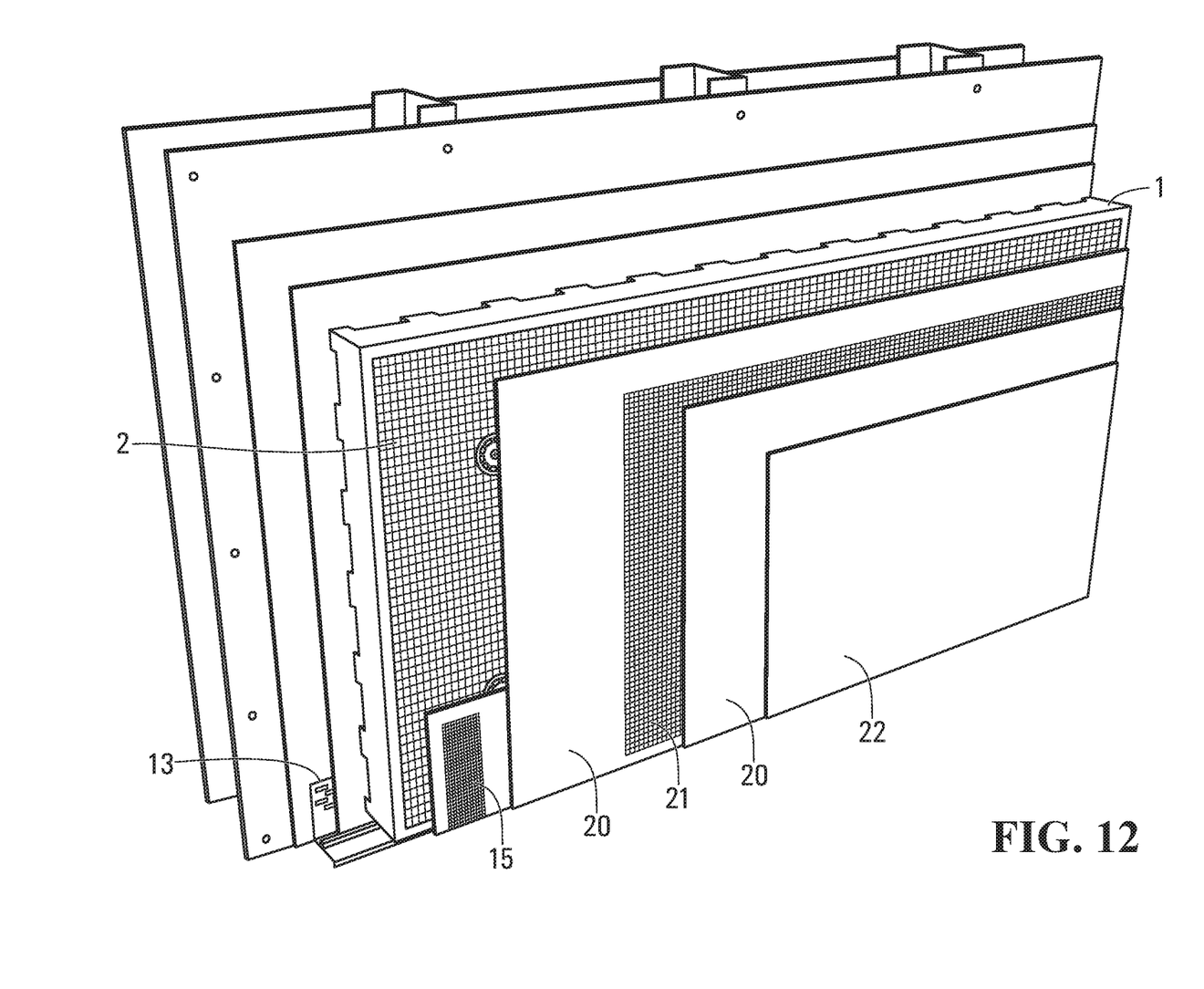
FIG. 12 is a partial section perspective view showing the application of a base coat over the fiber mesh a front surface of the mineral wool insulation board, a prep coat, an additional fiber mesh embedded in the prep coat, and the exterior finish coating.

The steps of applying a weather resistant coating on the reinforcing mesh 2 and washers 18 is shown in FIGS. 10-12. FIGS. 10-11 show the bottom edge wrap fiber mesh 15 installed to wrap the bottom edge of the mineral wool insulation board 1. The mesh 15 is then overlaid with a preparation (prep) coat layer 19. FIG. 12 shows the application of a prep coat 20 over the fiber mesh 2 on the front surface of the mineral wool insulation board 1. An additional fiber mesh 21 is embedded in the prep coat 20 and after the prep coat 20 is cured, the exterior finish coating 22 is applied.

Figure 7:
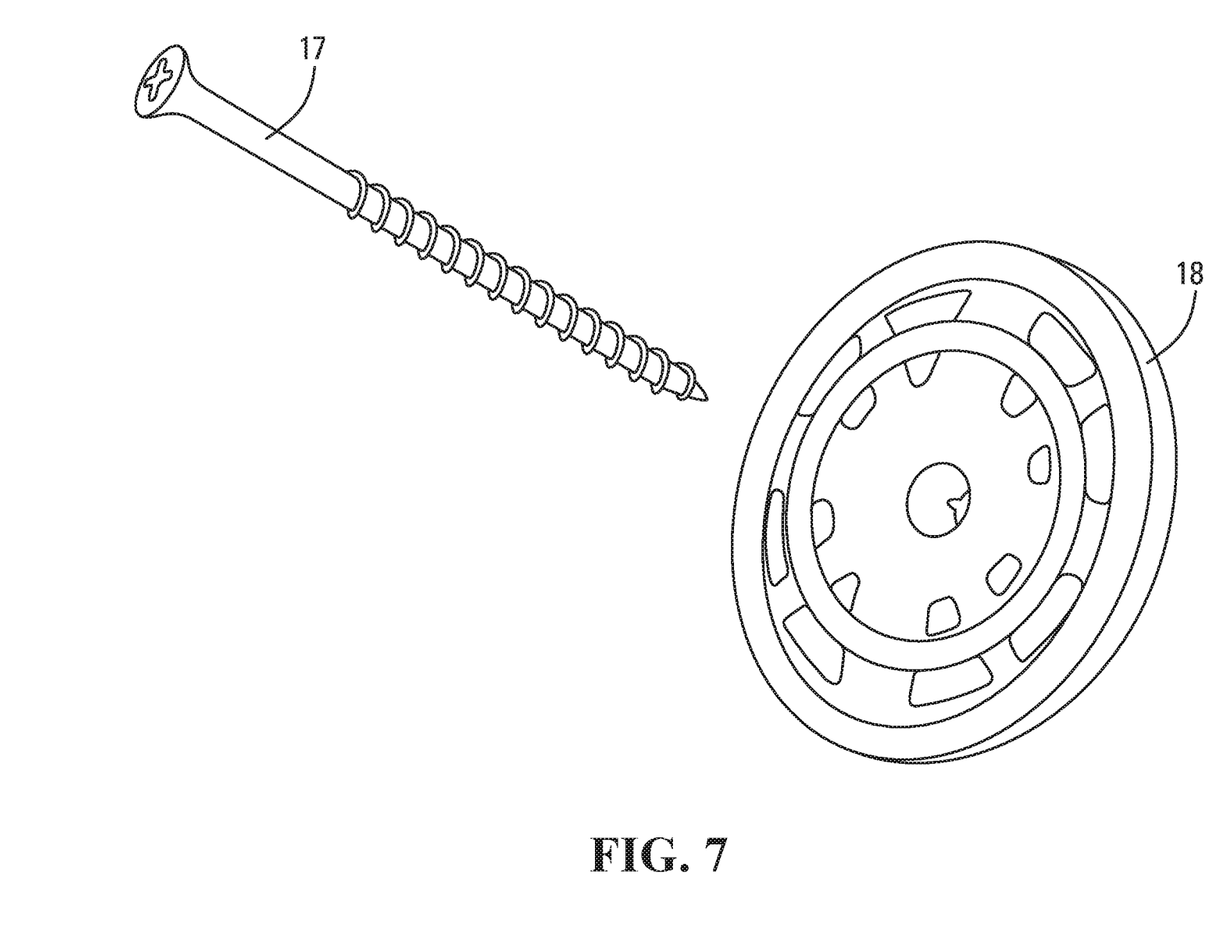
FIG. 7 shows front and side views of a conventional corrosion resistant screw fastener with a flat plastic washer for securing insulation boards to building wall substrates and studs.

Referring to FIGS. 7-8, it will be appreciated that the mineral wool insulation board 1 is a compressible fibrous mass made of mechanically entangled non-woven hydrophobic fibers spaced apart by air voids. The washer 18 and screw 17 exerts pressure on a compressed zone 23 of the compressible fibrous mass adjacent to the screw 17 and beneath the washer 18. The compressed zone 23 has a reduced moisture permeability relative to the uncompressed zone 24 that is remote from the washer 18. The compressed zone 23 has a higher volume percentage of fibers and a lower volume percentage of air voids relative to a non-compressed zone 24 of the compressible fibrous mass.

Water will flow on the path of least resistance and under the force of gravity downwards through the compressible fibrous mass of the non-compressed zone 24. The fibers are hydrophobic and repel water so that water within the insulation tends to bead into droplets which then flow under gravity generally downwards through the fibrous mass of the insulation until the droplets encounter the moisture barrier 12 and/or the flashing 13. The compressed zone 23 having a lower volume of air voids will impede water flow and forms a gasket-like barrier to water flow surrounding the shank of the screw 17. The compressed zone 23 impedes moisture penetration through the moisture barrier 12 in the vicinity of the screw 17 and the perforation that the screw 17 creates through the moisture barrier 12. The compressed zone 23 effectively forms a water resistant boundary around the screw 17 to impede moisture penetration through the moisture barrier 12.

Although the above description relates to a specific preferred embodiment as presently contemplated by the inventor, it will be understood that the invention in its broad aspect includes mechanical and functional equivalents of the elements described herein.

I claim:

1. A method of constructing an exterior insulated wall, the method comprising:

erecting a wall structure comprising a plurality of vertical studs in a horizontally spaced apart array and sheathing mounted to the studs defining a vertical substrate surface;

applying a moisture barrier layer over the substrate surface;

applying an adhesive layer over the moisture barrier layer;

mounting a rear surface of a mineral wool insulation board to the adhesive layer, the rear surface having vertically extending drainage grooves defining a plurality of bosses whereby the bosses engage the adhesive layer and the drainage grooves define moisture flow channels between the mineral wool insulation board and the adhesive layer, a front surface of the mineral wool insulation board including a reinforcing mesh adhered thereto;

securing the mineral wool insulation board to the studs with corrosion resistant screws and washers, the washers engaging the reinforcing mesh, the screws extending through the reinforcing mesh and the bosses of the mineral wool insulation board, through the adhesive and moisture barriers, and through the sheathing into the studs; and applying a weather resistant coating on the reinforcing mesh and washers;

wherein the mineral wool insulation board comprises mechanically entangled non-woven hydrophobic fibers spaced apart by air voids to define a compressible fibrous mass;

wherein the mechanically entangled non-woven hydrophobic fibers are oriented generally parallel to the vertical substrate surface; and wherein the washers and screws exert pressure on a compressed zone of the compressible fibrous mass adjacent to the screws and beneath the washers, the compressed zone having a reduced moisture permeability with a higher volume percentage of fibers and a lower volume percentage of air voids relative to a non-compressed remainder of the compressible fibrous mass, and wherein the washers and screws exert pressure on the compressed zone of the fibrous mass at a location of at least one of the plurality of bosses, the fibers of the compressed zone being configured to impede water flow around the screws;

wherein the mechanically entangled non-woven hydrophobic fibers oriented generally parallel to the vertical substrate surface define a flow path through the non-compressed remainder of the compressible fibrous mass to the moisture flow channels between the mineral wool insulation board and the adhesive layer.

2. The method according to claim 1 wherein the drainage grooves comprise interconnecting annular recesses defining disc shaped bosses.

3. The method according to claim 1 wherein the front surface of the mineral wool insulation board is perforated with a plurality of alignment holes aligned with a center of the bosses.

4. The method according to claim 1 wherein the reinforcing mesh comprises a grid of overlapping strands of fibre.

5. The method according to claim 4 wherein the reinforcing mesh is bonded to the front surface of the mineral wool insulation board with an adhesive.

6. The method according to claim 1, wherein an additional fiber mesh is embedded in the weather resistant coating.

7. The method according to claim 6, wherein applying a weather resistant coating on the reinforcing mesh and washers comprises:

overlaying a preparation coat layer on the reinforcing mesh and washers;

embedding the additional fiber mesh in the preparation coat layer; and applying an exterior finish coating of the weather resistant coating.

8. A system for constructing an exterior insulated wall, the system comprising:

a wall structure comprising a plurality of vertical studs in a horizontally spaced apart array and sheathing mounted to the studs defining a vertical substrate surface;

a moisture barrier layer applied over the substrate surface;

an adhesive layer applied over the moisture barrier layer;

a mineral wool insulation board having a rear surface mounted on the adhesive layer, the rear surface having vertically extending drainage grooves defining a plurality of bosses whereby the bosses engage the adhesive layer and the drainage grooves define moisture flow channels between the mineral wool insulation board and the adhesive layer, a front surface of the mineral wool insulation board including a reinforcing mesh adhered thereto;

a plurality of corrosion resistant screws and washers securing the mineral wool insulation board to the studs, and a weather resistant coating applied on the reinforcing mesh and washers;

wherein;

the washers engage the reinforcing mesh, the screws extend through the reinforcing mesh and the bosses of the mineral wool insulation board, through the adhesive and moisture barriers, and through the sheathing into the studs; and the mineral wool insulation board comprises mechanically entangled non-woven hydrophobic fibers spaced apart by air voids to define a compressible fibrous mass;

the mechanically entangled non-woven hydrophobic fibers are oriented generally parallel to the vertical substrate surface; and the washers and screws exert pressure on a compressed zone of the compressible fibrous mass adjacent to the screws and beneath the washers, the compressed zone having a reduced moisture permeability with a higher volume percentage of fibers and a lower volume percentage of air voids relative to a non-compressed remainder of the compressible fibrous mass, and wherein the washers and screws exert pressure on the compressed zone of the fibrous mass at a location of at least one of the plurality of bosses, the fibers of the compressed zone being configured to impede water flow around the screws;

wherein the mechanically entangled non-woven hydrophobic fibers oriented generally parallel to the vertical substrate surface define a flow path through the non-compressed remainder of the compressible fibrous mass to the moisture flow channels between the mineral wool insulation board and the adhesive layer.

9. The system according to claim 8 wherein the drainage grooves comprise interconnecting annular recesses defining disc shaped bosses.

10. The system according to claim 8 wherein the front surface of the mineral wool insulation board is perforated with a plurality of alignment holes aligned with a center of the bosses.

11. The system according to claim 8 wherein the reinforcing mesh comprises a grid of overlapping strands of fibre.

12. The system according to claim 11 wherein the reinforcing mesh is bonded to the front surface of the mineral wool insulation board with an adhesive.

13. The system according to claim 8, wherein an additional fiber mesh is embedded in the weather resistant coating.

14. The system according to claim 13, wherein the weather resistant coating applied on the reinforcing mesh and washers comprises:

a preparation coat layer overlaid on the reinforcing mesh and washers;

the additional fiber mesh embedded in the preparation coat layer; and an exterior finish coating of the weather resistant coating applied on the preparation coat layer and the additional fiber mesh.

\* \* \* \* \*